US005579925A

United States Patent [19]
Peng

[11] Patent Number: 5,579,925
[45] Date of Patent: Dec. 3, 1996

[54] COMPACT DISK CONTAINER STORAGE AND DISPENSING DEVICE

[76] Inventor: Jung-Ching Peng, P.O. Box 82-144, Taipei, Taiwan

[21] Appl. No.: 191,533

[22] Filed: Feb. 4, 1994

Related U.S. Application Data

[63] Continuation-in-part of Ser. No. 186,624, Jan. 26, 1994, which is a continuation-in-part of Ser. No. 182,359, Jan. 18, 1994, Pat. No. 5,370,244.

[51] Int. Cl.[6] .......... A47G 29/00

[52] U.S. Cl. .......... 211/40; 211/41; 211/129

[58] Field of Search .......... 211/40, 41, 59.2, 211/59.4, 95, 128, 129, 81, 96; 312/9.9, 9.58, 9.63, 9.64; 206/309, 387

[56] References Cited

U.S. PATENT DOCUMENTS 1,027,701 5/1912 Deming .......... 211/129 X
1,429,339 7/1922 Green .......... 312/9.58
1,439,441 12/1922 Ouellette .......... 312/9.58
2,914,189 11/1959 Bishop et al. .......... 211/129
5,099,995 3/1992 Karakane et al. .......... 312/9.58 X

*Primary Examiner*—Ramon O. Ramirez
*Assistant Examiner*—Korie H. Chan
*Attorney, Agent, or Firm*—Alfred Lei

[57] ABSTRACT

A compact disk container storage and dispensing device including: a bracket having a left edge and a right edge, a plurality of horizontal arms extending from the left edge and having a tubular portion at an end, and a plurality of tubular portions corresponding to the horizontal arms provided at the right edge; and a plurality of holders each pivotally connected between every two of the tubular portions at the right edge of said bracket, each of said holders being a a rectangular member formed with two rear lugs at a first side, a front lug at a second side opposite to the first side, a first ear at a third side, a second ear at a fourth side, and a tubular member at the first side, said first ear and second ear being provided with a plurality of protuberances at the inner side thereof, said front lug being provided with a hook-like edge at the top.

1 Claim, 4 Drawing Sheets

COMPACT DISK CONTAINER STORAGE AND DISPENSING DEVICE

CROSS-REFERENCE

This invention is a continuation-in-part application of application Ser. No. 08/186,624, filed Jan. 26, 1994 which is a continuation-in-part of application No. 08/182,359, filed Jan. 18, 1994, and now U.S. Pat. No. 5,370,244.

BACKGROUND OF THE INVENTION

Devices for storing compact disks are well known in the art. However, none of the prior art devices available to the public has adequately met all of the goals of: simplicity of design; visual aesthetics; ready accessibility of contents; reliable operations mechanisms; visual accessibility of label information; and reasonable density of storage. Improvements in each of these areas is particularly desirable in the industry. Furthermore, it is of extreme value to provide a device which combines all of the desirable characteristics set forth above.

SUMMARY OF THE INVENTION

This invention relates to an improved compact disk container storage and dispensing device.

It is the primary object of the present invention to provide a compact disk container storage and dispensing device which is easy to operate.

It is another object of the present invention to provide a compact disk container storage and dispensing device which can prevent the compact disk from dropping out.

It is still another object of the present invention to provide a compact disk container storage and dispensing device which is simple in construction.

It is still another object of the present invention to provide a compact disk container storage device and dispensing device which is economic to produce.

It is a further object of the present invention to provide a compact disk container storage and dispensing device which can store the compact disk in a secure but convenient manner.

These and other objects and advantages of the present invention will become clear to those skilled in the art in view of the description of the best presently known mode of carrying out the invention and the industrial applicability of the preferred embodiment, as described herein and as illustrated in the several figures of the drawing.

DETAILED DESCRIPTION OF THE PREFERRED EMBODIMENT

Figure 1:
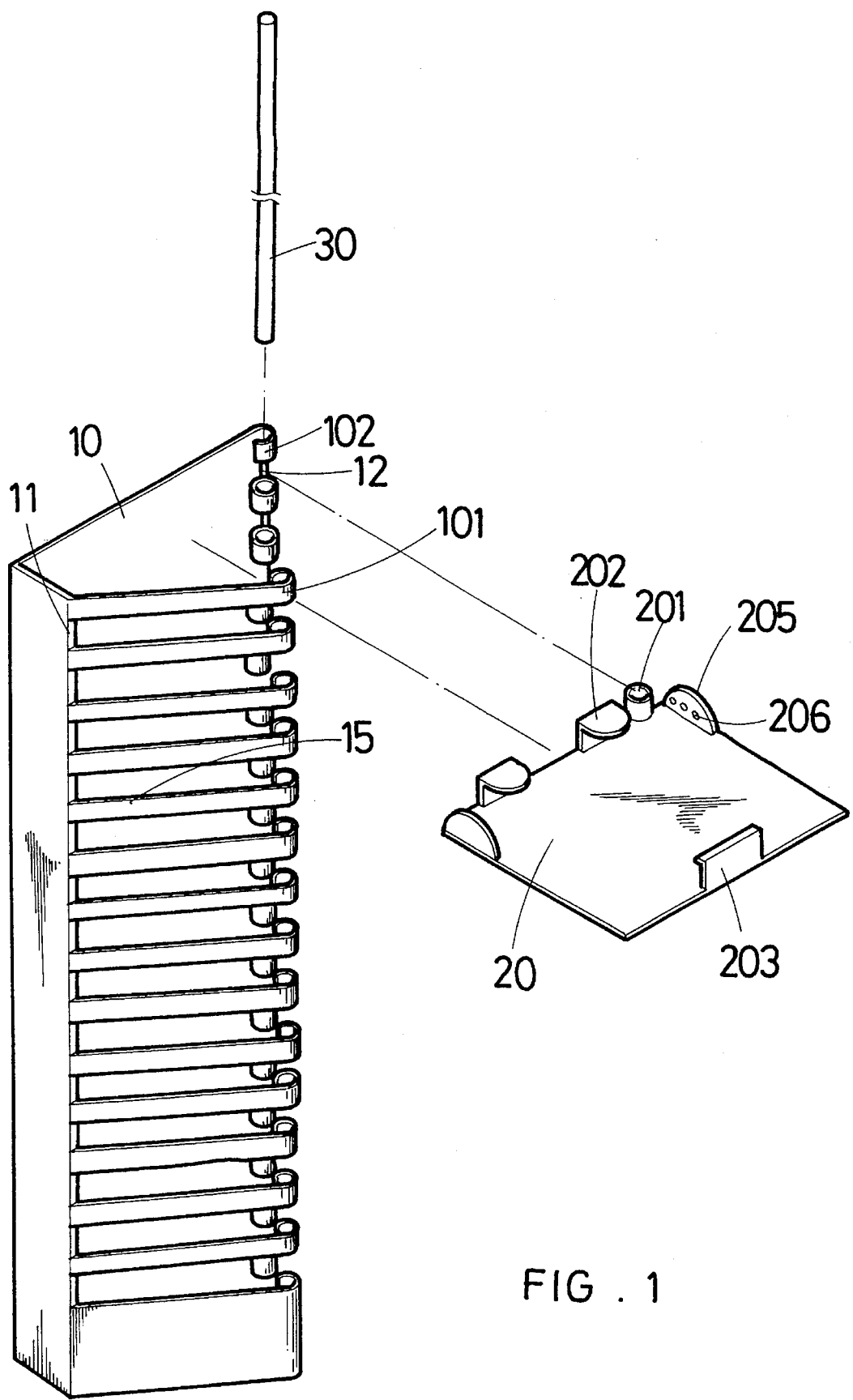
FIG. 1 is an exploded view of the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
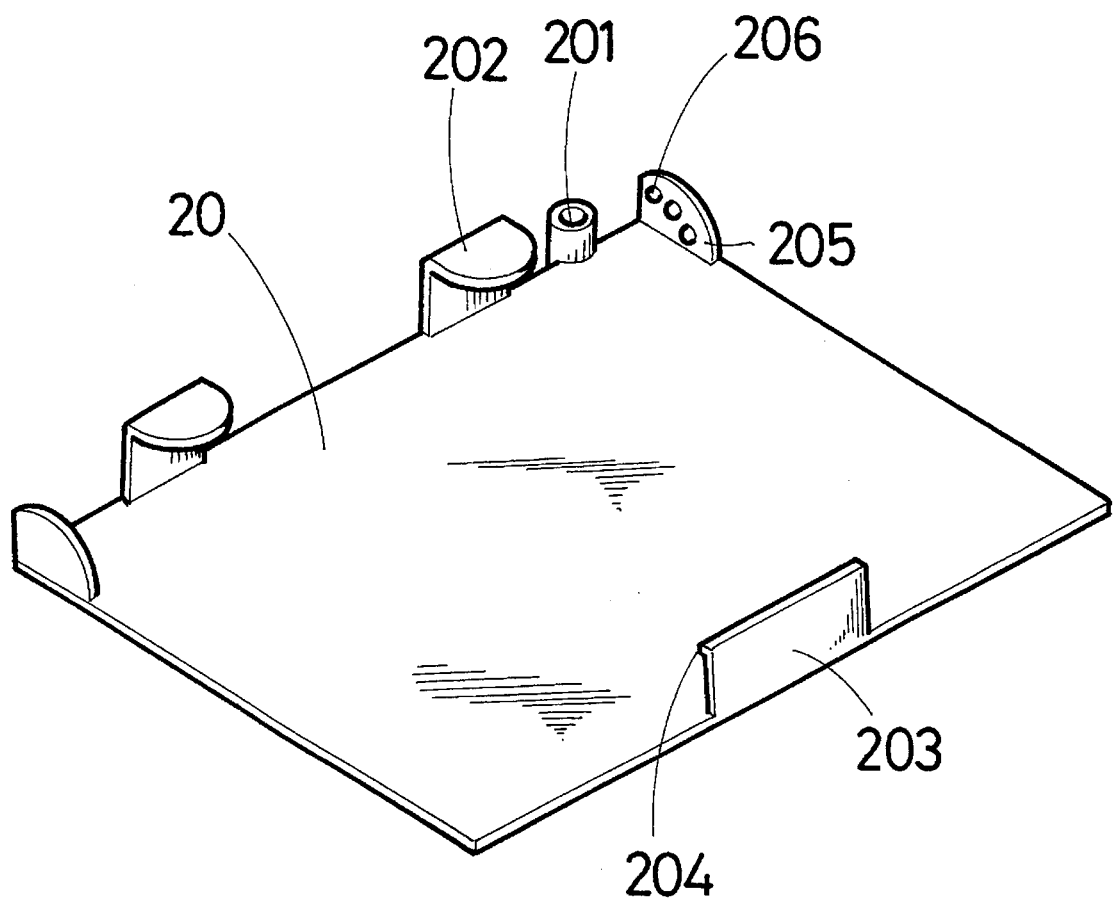
FIG. 2 is a perspective view of the holder.

With reference to the drawings and in particular to FIGS. 1 and 2 thereof, the compact disk container storage and dispensing device according to the present invention comprises a bracket 10 having a left edge 11 and a right edge 12. A plurality of horizontal arms 15 extend horizontally from the left edge 11 and have a tubular portion 101 at the end. A plurality of tubular members 102 corresponding to the arms 15 are provided at the right edge 12. A holder 20 is connected between every two tubular members 102 of the bracket 10. The holder 20 is a rectangular member formed with two rear lugs 202 at a first side, a front lug 203 at a second side opposite to the first side, a first ear 205 at a third side, a second ear 205 at a fourth side, and a tubular member 201 at first side. The tubular member 201 of the holder 20 is pivotally connected between every two tubular portions 12 of the bracket 10 by a pin 30 extending through the tubular portions 12 of the bracket 10 and the tubular member 201 of the holder 20 so that the holder 20 can be turned out of the bracket 10 (see FIG. 4).

Figure 3A:
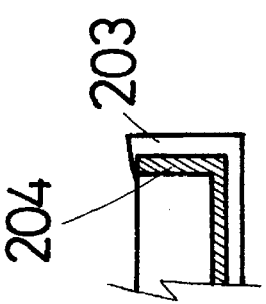
FIG. 3A is an enlarged fragmentary sectional view of the present invention.
Figure 3:
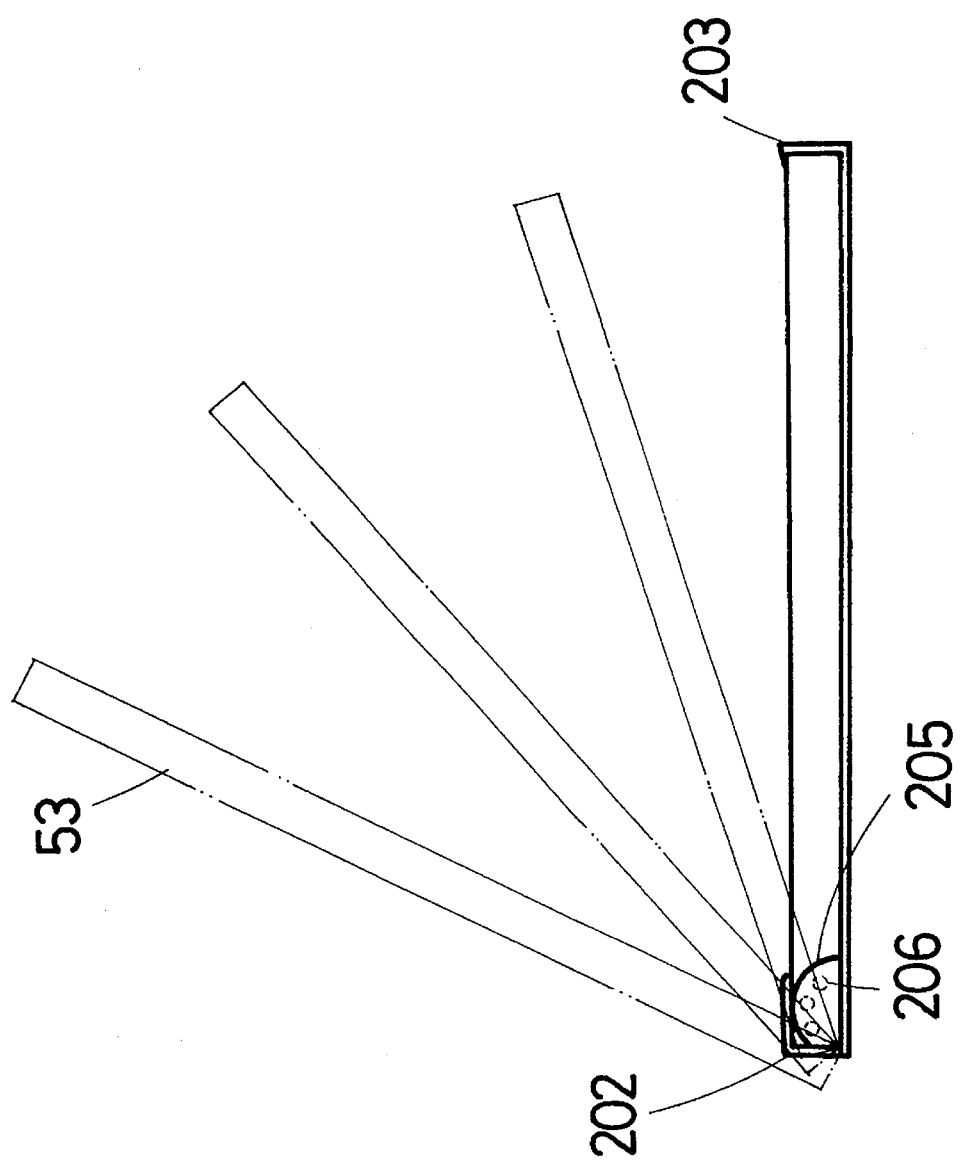
FIG. 3 shows the principle of the present invention.
Figure 4:
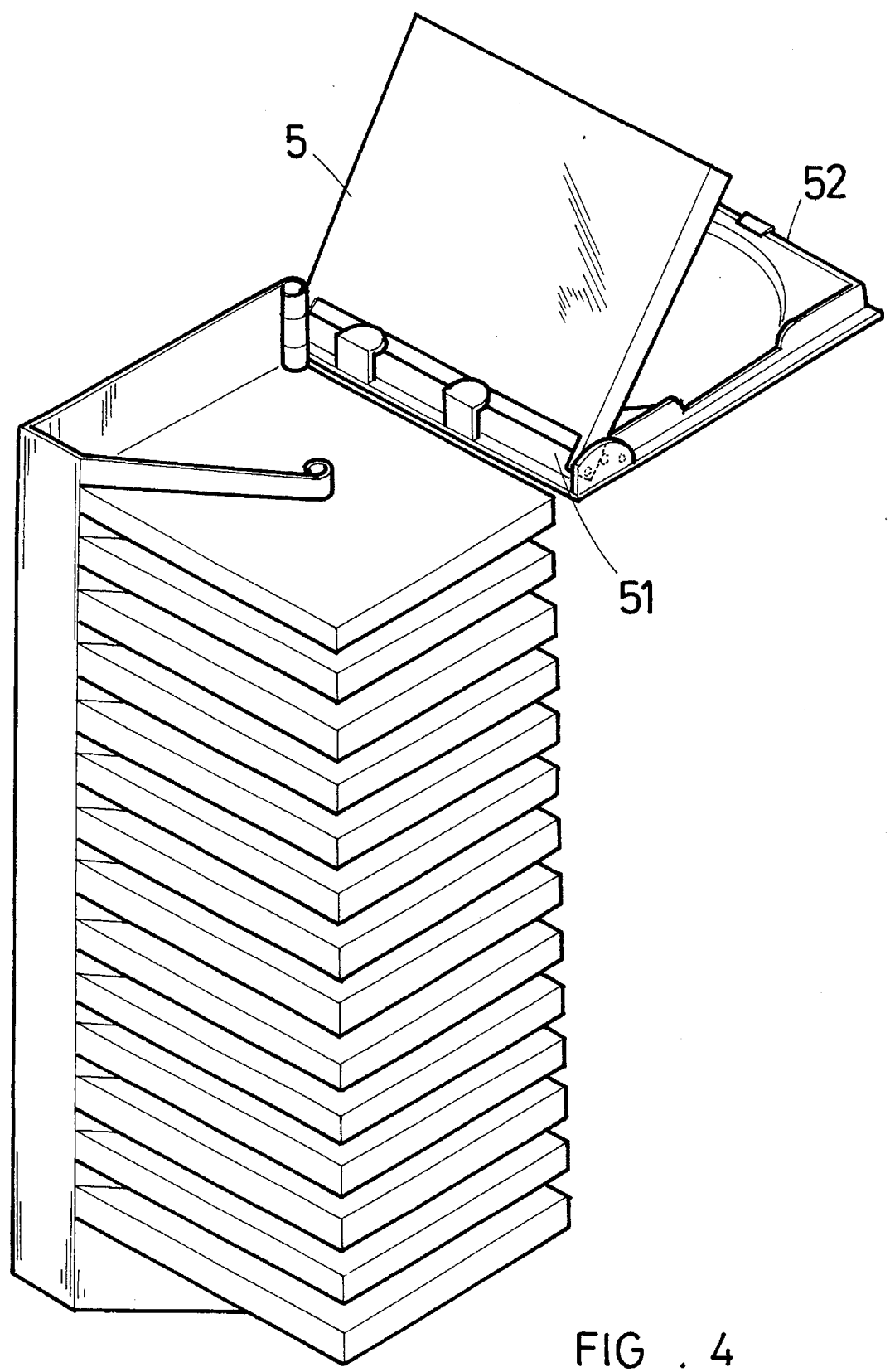
FIG. 4 is a working view of the present invention.

When in use, first place a compact disk container 5 in the holder 20 in such a way that the spine 51 and the fore-edge 52 of the compact disk container 5 are engaged with the rear lugs 202 and the hook-like edge 204 of the front lug 203 of the holder 20 respectively and the compact disk container 5 disposed between the two ears 205 of the holder 20 (see FIGS. 3, 3A and 4).

When desired to open the compact disk container 5, simply turn the holder 20 together with compact disk container 5 out of the bracket 10 and pull open the cover 53 of the compact disk container 5. As the cover 53 of the compact disk container 5 is open, the cover 53 may be kept at different positions by the protuberances 206 on the inner side of the ears 205.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A compact disk container storage and dispensing device comprising:

a bracket having a left edge and a right edge, a plurality of horizontal arms extending from the left edge and each having a tubular portion at an end, and a plurality of tubular portions corresponding to the horizontal arms provided at the right edge; and a plurality of holders each pivotally connected between every two of the tubular portions at the right edge of said bracket, each of said holders being a rectangular member formed with two rear lugs at a first side, a front lug at a second side opposite to the first side, a first ear at a third side, a second ear at a fourth side, and a tubular member at the first side, said first ear and second ear being provided with a plurality of protuberances at an inner side thereof, said front lug being provided with a hook-like edge at the top.

* * * * *